United States Patent [19]

Singh et al.

[11] 4,298,622

[45] Nov. 3, 1981

[54] METHOD FOR PRODUCING WHEAT GERM LIPID PRODUCTS

[75] Inventors: Laxman Singh, Calumet City, Ill.; Wayne K. Rice, Wanatah, Ind.

[73] Assignee: Vitamins, Inc., Chicago, Ill.

[21] Appl. No.: 26,749

[22] Filed: Apr. 3, 1979

[51] Int. Cl.$^3$ .......................... A23L 1/277; A23L 1/30
[52] U.S. Cl. ....................................... 426/254; 203/35; 203/48; 203/91; 426/311; 426/422; 426/492; 426/495
[58] Field of Search ................. 426/72, 311, 492, 495, 426/417, 416, 253, 655, 254, 422; 203/91, 31, 35, 89, 48, ; 62/532; 424/195, 284; 260/236.5; 202/205

[56] References Cited

U.S. PATENT DOCUMENTS

| | | | |
|---|---|---|---|
| 2,199,995 | 5/1940 | Hickman | 203/89 |
| 2,221,692 | 11/1940 | Hickman et al. | 426/311 |
| 2,249,524 | 7/1941 | Hickman et al. | 203/89 |
| 2,478,089 | 8/1949 | Clayton | 203/89 |
| 2,619,421 | 11/1952 | Greenfield | 426/417 |

OTHER PUBLICATIONS

Andersen, "Refining of Oils and Fats", (1962), pp. 32–42, 134–137.

*Primary Examiner*—Peter Chin
*Attorney, Agent, or Firm*—Cook, Wetzel & Egan, Ltd.

[57] ABSTRACT

Wheat germ oil is treated by degumming with phosphoric acid and water, bleaching with activated clay and distilled in a centrifugal molecular still at 140°–200° C. at pressures below 50 milli-torr. The free fatty acids which are removed by the distillation step may be recovered as valuable by-products. The phospholipids removed in the degumming step may be recovered as valuable by-products. A vitamin E concentrate may be prepared by further distilling the purified wheat germ oil at 220°–300° C. at pressures below 25 milli-torr.

15 Claims, No Drawings

METHOD FOR PRODUCING WHEAT GERM LIPID PRODUCTS

The present invention relates to the production of wheat germ oil lipid products.

Wheat germ oil, which is derived from wheat germ, inherently contains a substantial portion of free fatty acids. At the time it is harvested and prior to milling, wheat germ oil, within the wheat germ, contains relatively low levels of free fatty acids. However, upon milling, the wheat germ is exposed to oxygen from air which causes rapid oxidation of the wheat germ oils to form free fatty acids. The wheat germ oil is rich in unsaturated components which are susceptible to oxidation. Moreover, the wheat germ oil contains the enzyme lipase, which catalyzes the oxidation of the wheat germ oils to form free fatty acids. Free fatty acids which are found in wheat germ oil have a strong bitter flavor. Wheat germ oil containing as little as 5–7% by weight of free fatty acids has a distinct bitter, soap-like flavor. The free fatty acids, which typically comprise from 5–25% of the overall wheat germ oil must be removed or reduced from the natural level for certain commercial uses. It is generally felt that the lowest possible level of free fatty acids is desired.

DESCRIPTION OF THE PRIOR ART

The art has recognized that it is desirable to reduce the free fatty acid level of wheat germ oil. The current commercial process involves extracting the oil from the wheat germ soon after milling, while the wheat germ is fresh and the oil has not been oxidized. The fresh wheat germ oil is treated with strong caustic to saponify the free fatty acids, which are then removed from the oil. The resulting soap stocks are toxic and difficult to dispose of. Although such soap stocks have been used as an additive to poultry feed, the price commanded for such use is very low. In addition to consuming from 25–50% of the oil in a saponification process, the alkali process substantially reduces the vitamin E content of the wheat germ oil.

Attempts have been made to distill the fatty acids from the wheat germ oil, e.g., see Green & Watt, "Concentration of Tocopherols", JSFA 1, May 1950, pp. 157–162, and "Molecular Stills" by Ridgeway Watt, Barnes & Noble, 1963, pp 140–141, but the prior attempts have encountered great difficulty in degassing the oil and producing charred compoents on the evaporator and other portions of the still, whereby the still is rendered inoperative.

The present invention overcomes the difficulties encountered by the prior art workers through the use of a specific pre-treatment of the wheat germ oil followed by molecular distillation in a rotary still to give a quantitative recovery of an improved wheat germ oil and its by-products.

BRIEF DESCRIPTION OF THE PRESENT INVENTION

The process contemplated by the present invention commences with a conventional wheat germ oil, which is preferably relatively fresh. The crude wheat germ oil is degummed by treating it with from 0.2 to 1.0% phosphoric acid and sufficient water at 40°–80° C. for 30 minutes to 3 hours. The thus treated oil is then centrifuged to separate the gums and the gum-free wheat germ oil is recovered. The gum may also be recovered.

The degummed oil is then bleached by treating it with up to 10% by weight of adsorbant, such as activated clay at 90°–110° C. for about 30–120 minutes under strong vacuum. The adsorbant is then filtered out and a clear, light, dry oil is recovered. All these steps must be carried out in the absence of iron equipment, i.e., through the use of glass or stainless steel tanks, pipes and filters, in order to avoid darkening the oil and imparting off-flavors during the subsequent molecular distillation. The degummed, bleached oil is placed in a centrifugal molecular still and the free fatty acids are distilled off at 140°–200° C. and less than 50 milli-torr pressure. The purified de-acidified oil is taken off at the bottom of the still, cooled, collected and stored under an inert atmosphere.

The resulting purified wheat germ oil contains less than 2% by weight of free fatty acids, more than 2.5 milligrams of tocopherol per gram of oil and at least 2.0 I.U. of vitamin E per gram of oil. Further, the purified wheat germ oil of the present invention is rich in unsaturated components, in that the fatty acid components typically include 55.4% linoleic acid, 6.8% linolenic acid, 19.8% oleic acid and 18.0% saturated acids.

An additional advantage of the present invention resides in that the free fatty acids distilled from the wheat germ oil in the molecular still are exceptionally pure and can be used as an article of commerce. This process provides a vitamin E-containing composition consisting essentially of free fatty acids derived from wheat germ oil, said fatty acids having the following approximate profile:

| | |
|---|---|
| 0.12% | myristic acid |
| 22.6% | palmitic |
| 0.27% | palmitoleic |
| 0.94% | stearic |
| 16.50% | oleic |
| 52.3% | linoleic |
| 6.9% | linolenic |
| 0.29% | arachidonic |

The present invention also contemplates the formation of derivatives of these fatty acids, including: anionics such as sulfates, ether sulfates sulfosuccinates, amineoxides; cationics such as quaternaries, amido amide salts, etc; amphoterics such as imidazolines, betaines; and non-ionics such as fatty esters, ethers, and amides.

Moreover, it has been found possible to produce a vitamin E concentrate by treating the refined wheat germ oil to a second distillation step at temperatures of 220°–300° C. at pressures less than 25 milli-torr wherein vitamin E and certain oil components and oil fractions are taken off as distillates to produce a concentrate containing as much as 30 I.U. vitamin E per gram of concentrate.

Importantly, the free fatty acids recovered by the distillation process is rich in vitamin E and includes an unique profile of fatty acid components. Moreover, the present invention provides a substantially complete recovery of the natural tocopherols. The process of the present invention may also be applied to other oils having high free fatty acids, such as rice bran oil and palm oil.

DETAILED DESCRIPTION OF THE INVENTION

In carrying out the present invention, it is generally preferred that the wheat germ oil be extracted from the wheat germ promptly after milling. The oil may be extracted from the wheat germ through the use of solvents or through mechanical processes, such as expressors or presses. As was pointed out above, the fresh wheat germ oil generally contains lower amounts of free fatty acids. The amount of acid which occurs in the wheat germ oil will vary from season to season and to some extent depends in part on the length of storage of the wheat prior to milling. The present invention is adapted to remove extremely high levels of free fatty acid from the oil which cannot be removed economically by chemical means because of low yield.

The degumming process is essential to form an oil which may be passed through the molecular still without charring. It has been found that about 0.5% by weight of phosphoric acid is preferably used in the degumming process, although higher or lower amounts may be used. The time required to effectively remove the gum is dependent in some measure upon the amount of acid used. It has been found that acid levels of about 0.2% are enough to produce a degumming effect, but less gum is removed. On the other hand, it has been found that higher levels, e.g., 1% by weight of acid, tend to produce a darkened product and the excess acid is difficult to remove.

The actual amount of water employed in the degumming process is not highly critical, but sufficient water should be used in order to hydrate the phospho-lipids which exist in the gums, thus promoting the degumming action. Generally it has been found that from about 4 to 5% by weight of water is adequate to hydrate the gums in most cases, although this may vary depending upon the gum level of the particular oil being used.

It has been found that the gum hydration process will require from about 30 minutes to 1 hour at about 60° C. Preferably the hydration of the gums is accomplished by stirring the oil under inert gas for the preferred period of time. If the temperatures below about 60° C. are used, a greater time may be required. The process will be somewhat abbreviated if higher temperatures such as up to 80° C. are used, but the higher temperatures have a tendency to thermally degrade the oils and should be avoided if possible. The present invention contemplates the use of temperatures between about 40° and about 80° C. for the degumming, because the gums separate more readily upon centrifugation at these temperatures.

After the gums have been hydrated, the mixture is centrifuged to remove gums. Preferably the centrifuge is adapted to exclude air, in order to avoid entraining air with the oil during the centrifugation operation, and to avoid oxidation of the oil. Moreover it is deemed essential to use a stainless steel or glass lined continuous centrifuge which will avoid any iron contamination of the oil and also minimize the contact with air. The gum which is removed from the centrifuge as the underflow, contains the wheat germ oil phospho-lipids which are recovered and may be further refined to provide valuable products.

The bleaching step is important because naturally-occuring wheat germ oil is a very dark product which makes it unsuitable for many end uses. The bleaching is generally accomplished by treating the oil with an adsorbant such as activated bleaching clay. Those skilled in the art will be aware that many different types of bleaching agents are commercially available, such as bleaching earth, e.g., the Filtrols, the Tonsils, silica gel, activated charcoal and fullers earth. Good results have been achieved by using an activated clay sold under the trademark FILTROL 105. Generally from about 2 to about 10% by weight of clay based on the weight of the oil is mixed with the degummed oil. Because the bleaching treatment results in the loss of some oil, in that the clay adsorbs approximately its own weight of oil, the lowest quantity of clay or adsorbant able to accomplish the required bleaching should be used. Generally it is preferred to use about 5% by weight of clay, but this does not always produce an oil which is light enough. While 10% by weight of clay produces a very light oil, the losses are somewhat greater and the higher level of bleaching agent is not used unless required.

The bleaching step is carried out at elevated temperatures, preferably between 90° and 110° C. for times which vary between 30 minutes and 120 minutes. Preferably the oil is heated to about 90° at which time the clay is gradually added, while the heating is continued. The heating is discontinued when the temperature reaches 110° C., after which the oil is permitted to cool. Using this technique, the oil is in the 90°–110° C. range for about 1 hour. It is essential that the bleaching step be carried out under vacuum. The main purpose of the vacuum is to exclude any air from the presence of the oil while the oil is at relatively high temperatures involved, but a secondary purpose of the vacuum is to reduce the water content of the oil in preparation for the molecular distillation. Generally a vacuum of at least 28 inches of mercury is desired.

The clay is removed from bleached oil by conventional separation means, such as filtration or centrifugation.

The bleached oil may be fed directly to the molecular still, or optionally, it may be subjected to a winterization treatment prior to distillation. For example, it has been found that holding the bleached oil at 4° C. for 24 hours followed by recentrifugation will reduce the relative proportion of the high molecular weight components in the oil and allows the recovery of wheat germ oil waxes as a valuable by-product.

The present invention contemplates the use of various types of molecular stills, but it is preferred to use a centrifugal molecular still of the type described by Hickman. This type of still is preferred because it employs a short process residence time in contact with heated components, thus minimizing thermal degradation of the oil. The bleached, and optionally winterized oil is treated in the still in a single step, no special degassing step is required because of the pretreatments which are described above. The free fatty acids are distilled off at approximately 140°–200° C. at pressures less than 50 milli-torr, preferably less than 15 milli-torr. The free fatty acids may be recovered in highly purified forms, containing quantities of vitamin E. One function of the molecular distillation is to remove volatiles and any chlorinated hydrocarbons, such as may remain from pesticide residues and the like, thus permitting the recovery of oils free of such residues. The oil is recovered at the bottoms, substantially free of acids or free fatty acids and containing substantially all of the original vitamin E content of the oil. The resulting oil is recovered, cooled and stored under inert atmosphere.

The present invention further contemplates the preparation of a oil concentrate, wherein the oil recovered from the foregoing distillation process is subjected to a further distillation process at 220°–300° C. at pressures preferably less than 15 millitorr. These conditions cause the vitamin E to distill over along with other oil components to produce a composition which is rich in vitamin E. This process, when run at these conditions, can produce compositions containing 10 I.U. of vitamin E per gram and the present process can produce as much as 30 I.U. vitamin E per gram in a single pass.

There will now be given some preparative examples illustrating the preferred embodiments of the invention. These examples are merely for illustrative purposes and are not to be considered as a limitation upon the scope of the invention which is hereinafter claimed.

EXAMPLE 1

Degumming Wheat Germ Oil With Phosphoric Acid

It is well known that high concentrations of iron and phosphatides will result in an undesirable dark color and off-flavor in the distilled wheat germ oil. Iron content and oil darkness are directly related and the color of the final product depends to a large extent on the color of the starting wheat germ oil.

The crude wheat germ oil had a starting composition of 12% FFA, 3.4 mg/g total tocopherols, 4.5% phospholipids, and color reading of 12 on Gardner-Hellige scale. 0.5% $H_3PO_4$ (85%) by weight of oil was mixed with the crude wheat germ oil by stirring for 30 minutes at 60° C. Water, 5% of the weight of oil, was then added and the resultant mixture was stirred for 30 minutes at a temperature of approximately 60° C., plus or minus 5° C., in an inert gas atmosphere. Stainless steel equipment was utilized.

At the end of an hour, the treated oil was centrifuged to separate the gums and the gum-free wheat germ oil was recovered. A DeLavel continuous stainless steel centrifuge, adapted to exclude air, was utilized.

The degummed oil was recovered in a yield of 91% by weight. The removed gums were recovered. Degummed oil was found to contain less than 0.5% phospho-lipids.

EXAMPLE 2

Crude wheat germ oil similar to that used in Example 1 was degummed with 0.3% $H_3PO_4$ and 4% water in a manner described in Example 1. Degummed oil was recovered in 90% yield.

EXAMPLE 3

Recovery Of Wheat Germ Oil Gums

Gums obtained from Example 1 were further centrifuged to recover most of the entrapped oil. Gums were stirred with acetone in the amount of 10 times the weight of gum. Precipitated phospholipids were filtered and dried. Light colored dried gums amounted to 30% of the dry weight of the crude gums.

EXAMPLE 4

Bleaching Of The Degummed Oil

The recovered degummed oil from Example 1 above was heated to a temperature of 90° C. and 5% by weight of oil of an activated clay sold under the trademark FILTROL 105 was gradually added while heating was continued to a maximum of 110° C. The oil was bleached in the temperature range of 90°–110° C. for 1 hour. The entire process was under vacuum of at least 28 inches of mercury. Clay was removed by filtration. The yield of filtered oil was 95% of the degummed oil. Bleached oil contained phospholipids 0.3%, color Gardner-Hellige units 9, and FFA 11.7%.

EXAMPLE 5

Degummed oil from Example 2 was bleached in a manner described in Example 4. Bleached oil thus obtained provided 95% yield, Gardner-Hellige units 9 in color and 11.7% FFA.

EXAMPLE 6

Degummed oil from Example 2 was bleached with 10% Filtrol 105 in a manner described in Example 4. Bleached oil thus obtained provided 90% yield, Gardner-Hellige units 7 in color and 11.6% FFA.

EXAMPLE 7

Recovery Of Refined Oil And Free Fatty Acids

The recovered degummed and bleached oil from Example 4 was passed to a 15″ centrifugal molecular still of the type described by Hickman.

Free fatty acids were distilled off at a temperature of 150°–155° C. under 10–15 milli-torr pressure. The deacidified oil was cooled and collected under inert atmosphere with a yield of 90%. The approximate analysis of the refined, deacidified oil was as follows:

| | |
|---|---|
| Total tocopherols | 3.0 mg/g |
| Free Fatty Acid as Oleic Acid | 1.6% |
| Unsaponifiable matter | 4.72% |
| Specific Gravity, 25° C. | 0.92 |
| Iodine Value | 128.0 |
| Saponification Value | 186.0 |
| Refractive Index, 20° C. | 1.4783 |
| Composition of Fatty Acids: | |
| Polyunsaturated (Linoleic) | 55.4% |
| Polyunsaturated (Linolenic) | 6.8% |
| Monounsaturated (Oleic) | 19.8 |
| Saturated | 18.0 |

This oil was free from chlorinated pesticidal residue.

The free fatty acid distillate was recovered with a yield of 10%. In this example the tocopherol content was 6 mg/gram. Alpha-tocopherol proportion of deacidified oil as well as of free fatty acids was approximately 60% of total tocopherol.

The fatty acid profile for the recovered free fatty acids was approximately as follows:

| | |
|---|---|
| Myristic Acid | 0.12% |
| Palmitic | 22.6% |
| Palmitoleic | 0.27% |
| Stearic | 0.94 |
| Oleic | 16.50% |
| Linoleic | 52.3% |
| Linolenic | 6.9% |
| Arachindonic | 0.29%. |

The physical properties of the recovered free fatty acid distillate was as follows:

| | |
|---|---|
| Specific Gravity (40° C.) | .896 |
| Refractive Index (40° C.) | 1.460 |
| Ester Value | 3.5 |
| Iodine Value | 126.7 |
| Free Fatty Acid | 93% |
| Unsaponifiable Matter | 6.47% |
| Titer | 33.3° C. |
| Color (Gardner-Hellige) | 5.5 |
| Natural Vitamin E Content (as | |

| | | |
|---|---|---|
| alpha tocopherol) | 5.36 | I.U./gram |

EXAMPLE 8

A degummed and bleached oil containing 15.0% FFA was molecular distilled at 160° C. and 17 millitorr pressure. Distillate obtained was 15.7% of the feed. FFA content of oil and distillate was 1.5 and 97.6% respectively. Oil and recovered fatty acids contained 3.5 and 3.2 mg/g total tocopherols respectively.

EXAMPLE 9

Preparation Of Wheat Germ Oil Concentrate

A wheat germ oil concentrate, was prepared by further distillation to the deacidified, purified oil from Example 7. That oil was subjected to further distillation after the free fatty acids had been distilled off. Distillation was carried out at 225° C. under a pressure of 8 milli-torr. It was found that the vitamin E distilled over with the other oil components producing an end product rich in vitamin E with a yield of 17% of starting oil.

For a 5-fold concentration the recovered concentrate had the following analysis:

| | | |
|---|---|---|
| Total tocopherols | 12.63 | mg/g |
| Vitamin E | 11.29 | I.U./g |
| F.F.A. (oleic) | 4.30% | |
| Unsaponifiable Matter | 14.00% | |
| Specific Gravity, 30° C. | .921 | |
| Iodine Value | 121 | |
| Saponification value | 166 | |
| Fatty Acid Profile: | | |
| Myristic | 0.12% | |
| Palmitic | 19.23% | |
| Stearic | 0.51% | |
| Oleic | 16.68% | |
| Linoleic | 55.55% | |
| Linolenic | 7.42% | |
| Arachidonic | 0.35%. | |

EXAMPLE 10

Deacidified oil from Example 7 was molecularly distilled at 240° C. temperature and 7 millitorr pressure. Concentrate obtained as 11% distillate, contained 21 mg/g total tocopherols and 8% FFA.

The forms of invention herein shown and described are to be considered only as illustrative. It will be apparent to those skilled in the art that numerous modifications may be made therein without departure from the spirit of the invention or the scope of the appended claims.

What is claimed is:

1. A method of producing improved wheat germ oil which comprises:
   degumming wheat germ oil by mixing said oil with about 0.2 to 1.0% by weight of $H_3PO_4$ and sufficient water to hydrate the gums present in said oil, holding said mixture at a temperature between 40° and 80° C. for 30–180 minutes, and centrifuging said treated oil to separate gums;
   bleaching said degummed oil by mixing said oil with from about 2 to about 10% by weight of an adsorbant, holding said mixture at a temperature between 90° and 110° C. for between 30 minutes and 120 minutes under substantial vacuum, and separating said adsorbant from the treated oil;
   molecularly distilling said bleached oil in a centrifugal molecular still at 140°–200° C. and a pressure below 50 milli-torr to remove odor bodies and fatty acids therefrom; and
   recovering, as still bottoms, an improved wheat germ oil containing less than about 2% by weight free fatty acids and at least 2.5 milligrams per gram of tocopherols.

2. A method of producing improved wheat germ oil as described in claim 1, wherein said degumming step is carried out at a temperature of about 60° C. for about one hour.

3. A method of producing improved wheat germ oil as described in claim 1, wherein about 4 to 5% by weight of water is added to the oil to hydrate the gums.

4. A method of producing improved wheat germ oil as described in claim 1, wherein said adsorbant is one or more materials selected from the group consisting of activated clay, silica gel, and charcoal.

5. A method of producing improved wheat germ oil as described in claim 3, wherein said degummed oil is mixed with about 5% by weight of an activated clay.

6. A method of producing improved wheat germ oil as described in claim 1, wherein said mixture of said degumming step is performed in an inert gaseous atmosphere.

7. A method of producing improved wheat germ oil as described in claim 1, wherein the process is carried out in substantially iron-free equipment.

8. A method of producing improved wheat germ oil as described in claim 1, including the additional step of winterizing said oil prior to distillation, at approximately 4° C. for about 24 hours, and separating high molecular weight waxy-type materials from the oil.

9. A method of producing improved wheat germ oil as described in claim 1, including the additional step of recovering as distillate, purified free fatty acids.

10. A method of producing improved wheat germ oil as described in claim 1, including additional steps of recovering the gums separated from the oil by the centrifuge.

11. A method of producing a vitamin E concentrate which comprises producing a purified wheat germ oil as described in claim 1, followed by the additional steps of:
    molecularly distilling said improved wheat germ oil in a molecular still at 220°–300° C. and a pressure of less than 25 milli-torr; and
    recovering as distillate the vitamin E concentrate containing at least 10 I.U. of vitamin E per gram.

12. The method of claim 1, wherein the distillation is carried out at pressures less than 15 milli-torr.

13. The method of claim 11, wherein the distillation is carried out at a pressure less than 15 milli-torr.

14. A method of producing improved wheat germ oil as described in claim 1, wherein said degumming includes the step of holding mixture of oil and $H_3PO_4$ for a finite period of time at a temperature between 40° and 80° C., prior to the addition of the water.

15. A method of producing improved wheat germ oil as described in claim 1, wherein said degumming includes mixing the oil with about 0.4% by weight of $H_3PO_4$, holding said oil-acid mixture with stirring for about 30 minutes at about 60° C., thereafter adding about 5% by weight of water, based on the weight of the oil, and holding said oil-acid-water mixture with stirring for about 30 minutes at about 60° C.

* * * * *